May 22, 1956     J. E. BENJAMIN     2,746,318
ROTATIONAL STORAGE DEVICE
Filed Oct. 7, 1952
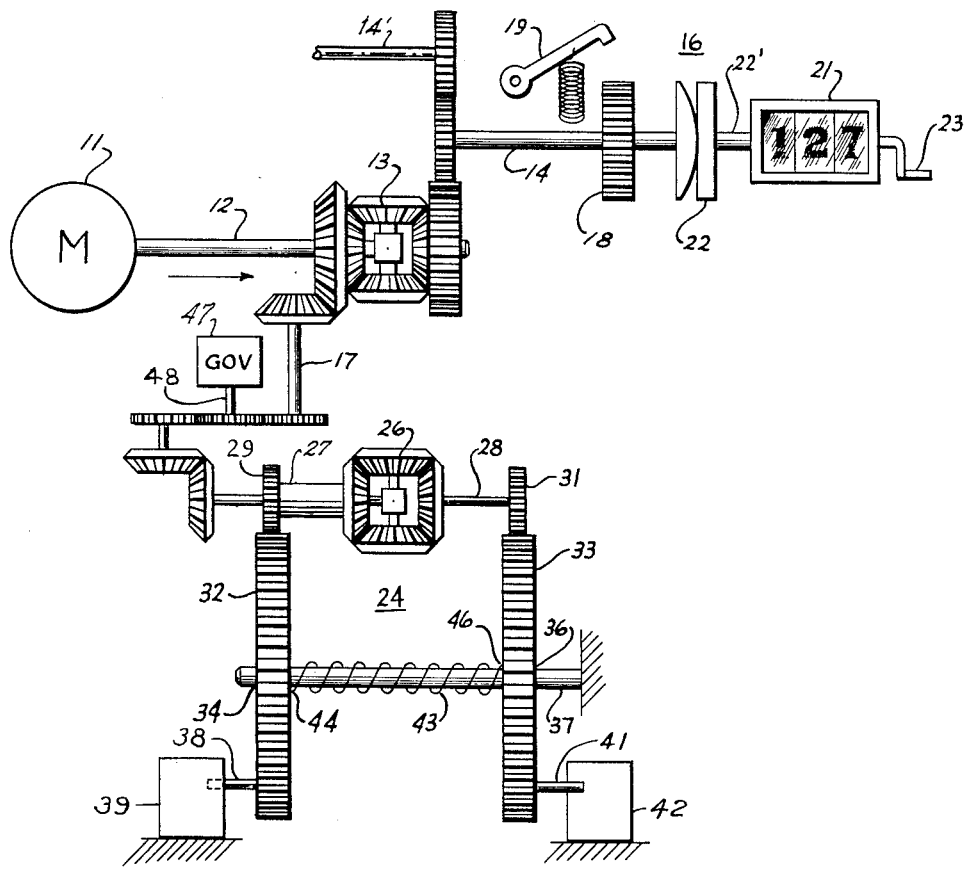
INVENTOR.
JUDSON E. BENJAMIN
BY
ATTORNEY

United States Patent Office 2,746,318
Patented May 22, 1956

2,746,318
ROTATIONAL STORAGE DEVICE

Judson E. Benjamin, White Plains, N. Y., assignor to General Precision Laboratory Incorporated, a corporation of New York Application October 7, 1952, Serial No. 313,565

9 Claims. (Cl. 74—665)

This invention relates to rotational devices for storing rotational deflections or other quantites.

The general purpose of this invention is to provide a device in which amounts of mechanical movement can be stored for an indefinite period of time and from which the same amounts of mechanical movement can be recovered after storage.

More specifically, one purpose is to provide a device for convenient and precise storage and recovery of angular deflections, there being substantially no loss of angular deflection in storage.

A further purpose is to provide a device for the storage and recovery of energy employing a resilient element.

The device of this invention consists in general of a torque or energy transmitting device connected to transmit energy to a receiving device or load with an energy storage device so interposed between input and output that depending on the relative torque resistance of the load and the storage device, the storage device may either act as a receiver of input energy or as a transmitter of stored energy to actuate the load.

In operation, control of a differential is exercised by the mechanical resisting torque of the load, so that when the load resisting torque is greater than that of the spring, all of the input goes into the spring, and when the load resisting torque is less than that of the spring, all of the input goes into the load. The spring is provided with a zero deflection stop and is prewound so that at zero deflection its exerts force against the stop, the same force resisting any input applied to it. The amount of this initial force determines the point at which inputs are switched from the load to the spring. After deflection or energy has been stored in the spring, when load resistance drops below the spring resistance, the deflections or energy feed into the load from the input source and the spring simultaneously until the spring has been restored to its stop position, when all of the deflection or energy stored in the spring will have been transmitted to the load.

A further understanding of this invention may be secured from the following detailed description and the accompanying drawing in which the single figure is a schematic illustration of an embodiment of the invention.

Referring now to the single figure, a motive means 11, which may be a motor or any other torque applying apparatus, rotates a shaft 12 to apply the input motion through a device 13 and shaft 14 to any motion receiving device or load device 16. The device 13 has as one function the transmission of the motion of shaft 12 to either shaft 14 or to a third shaft 17, depending on which shaft has less resistance to rotation, and may consist of a differential gear having three mechanical terminals one of which, shaft 12, is always a motion input terminal while either one of the others may be either an input or an output, the remaining one being respectively an output or input.

The load 16 is depicted as a passive load having no energy storage or generating ability, but having either adjustable resistance to the reception of motion, as by use of an adjustable brake, or by a positive lock preventing rotation. The latter is chosen for the purpose of illustration and is illustrated as consisting of a toothed wheel 18 secured to shaft 14, with a dog 19 adapted to engage the teeth of the wheel so as to prevent it and shaft 14 from turning. The shaft 14 drives a revolution counter 21 through a slip clutch 22, and a crank 23 is provided by which the revolution counter 21 may be manually turned either forward or backward to any desired setting.

It will be obvious that in place of the passive load a motion storage device may be utilized which either receives or transmits angular deflections through the shaft 14 depending on whether the torque exerted by such a storage device is either less than or greater than the torque exerted on the shaft 17.

The shaft 17 is connected to an angular deflection or energy storage device 24. This device is provided with a definite angular stop position measured in terms of angular deflection of the input shaft 17 and may be turned in either sense or angular direction from that stop position. This device as illustrated includes a gear differential 26 having three mechanical terminals, one being connected to shaft 17 and the others to sleeve 27 and shaft 28. Sleeve 27 and shaft 28 are terminated in similar pinions 29 and 31 which mesh with similar gears 32 and 33. The gears 32 and 33 are freely journalled in bearings 34 and 36 mounted on a fixed shaft 37. The gear 32 is provided with a stop pin 38 which engages a fixed stop 39. The gear 33 likewise has mounted thereon a stop pin 41 which engages a fixed stop 42. The relative positions of the stops 39 and 42 and pins 38 and 41 are as indicated so that if the figure be viewed from the right, counterclockwise rotation of the gear 33 will bring its pin 41 into the position shown and against the stop 42, preventing further rotation at this definite rotational position. Likewise, viewing the figure from the right, clockwise rotation of gear 32 will bring its pin 38 into the position shown against stop 39, preventing further rotation of this gear at this definite position.

A helical spring 43 is wound loosely around the axial shaft 37 and has one end 44 thereof secured to the gear 32 at a selected radial distance from its axis of rotation, while its other end 46 is secured to the gear 33 at a like selected radial distance from its axis of rotation. The spring 43 is placed under initial stress so that, when the shaft 17 is free, both stop pins 38 and 41 are held against their respective stops 39 and 42.

Let it be supposed that angular deflection is to be stored in the storage device for the purpose of maintaining an accurate record at the revolution counter 21 of the net number of revolutions made by the input shaft 12, which may revolve either forward or backward. Let it be supposed that clockwise rotation of shaft 12, observed from the right, causes counterclockwise rotation of shaft 14, shaft 17 not rotating, and that this rotation increases the count of counter 21. Counterclockwise rotation of shaft 12 then decreases the count of counter 21 so that at any time the counter indicates the algebraic sum or net rotation of the revolutions of shaft 12. Let it now be desired to set the counter 21 to a selected figure without destroying the accuracy of the accumulated angular deflection of the shaft 14 supplying it. For example, let it be supposed that shaft 14 through a branch 14' supplies other equipment and it is desired that momentary locking of the shaft have no effect on the aggregate angular deflection transmitted through 14'.

To set the counter 21 the dog 19 is caused to engage the toothed wheel 18, locking it and shaft 14 against rotation. Crank 23 is now turned by hand, causing slip clutch 22 to slip and shaft 22' to turn, setting the counter 21. The dog 19 is now lifted permitting the shaft 14 again to turn and to drive the counter 21.

During the time of immobility of shaft 14 the shaft 12 drives clockwise through differential 13, turning shaft 17 counterclockwise viewed from below, and tending to turn both sleeve 27 and shaft 28 in a direction that would be counterclockwise if viewed from the right. These torques produce torques on gears 32 and 33 tending to turn both of them clockwise as viewed from the right. However, torque in this direction cannot turn gear 32 because torque in this direction presses stop pin 38 against stop 39, but this torque can and does turn gear 33 because it is in such direction as to move stop pin 41 away from stop 42.

If the rotation of shaft 12 were counterclockwise, the opposite torques at gears 32 and 33 would cause gear 32 to rotate while gear 33 would be held at its stop.

The rotation of shaft 12 will continue to feed into the storage device as long as the shaft 14 is blocked or the resistance offered by the gear 18 is greater than the retractile torque of the spring 43. In some cases, in order to make the retractile torque of spring 43 nearly the same for the entire possible rotation of nearly one revolution of the gear, it may be desirable for the spring to have a large number of turns, or to be of a design giving even torque. Although the rotation of each gear as shown is confined to less than one revolution, the rotation limit may be made as large as desired by substituting a worm and nut type of stop for the simple stop shown. In addition, the use of pinion gearing as shown to drive the gears provides wide design latitude in this respect.

When angular deflections have been accumulated in one of the gears, 32 or 33, and when the lock is removed from shaft 14, shaft 12 will again rotate shaft 14 if the resistance to rotation of shaft 14 is less than that of shaft 17. In addition, the spring 43 will drive shaft 17 and its rotations will be added to those of shaft 12 in shaft 14. This action will continue until the gear which has been deflected has returned to its stop, at which time the angular deflection of shafts 14 and 14' will be exactly the same as if they had never been locked.

In order to prevent a destructively fast rate of energy flow from the storage device 24 to the differential 13, a governor 47 may be connected through shaft 48 to shaft 17. This governor should preferably be of the speed-limiting type, such as that employing a centrifugal element to operate a friction brake. Alternatively the governor may be of the velocity type such as a magnetic or viscous drag, or may contain an escapement movement. In any case the function of the governor is to regulate the flow of energy out of the reservoir or storage device while not impeding or aiding the flow of energy into it.

It is obvious that since a work force is imposed upon the spring 43 in using this device, it may be considered as an energy-storage mechanism as well as an angular-deflection-storage mechanism. When the receiving device or load 16 is of a nature to receive energy as such, rather than merely angular deflections, such a device as that described may be employed to permit short-time storage of energy during transmission through shaft 14 to the receiving device, so that in spite of momentary interruptions of the ability of device 16 to receive, nevertheless all energy transmitted to it will eventually be received by it.

What is claimed is:

1. A motion storage device comprising, an algebraic adding device having an input terminal and a pair of energy transmitting terminals, means for imposing a torque on said input terminal, a utilization device connected to one of said pair of energy transmitting terminals for receiving torque therefrom, a storage device connected to the other of said pair of terminals for the interchange of torque therewith, said utilization device normally having less resistance to motion than said storage device.

2. A motion storage device comprising, an input shaft having a rotational input force applied thereto, an output shaft connected to a utilization device, an energy storage device, an energy transmitting shaft connected thereto, and a differential interconnecting said input, output and energy transmitting shafts.

3. A motion storage device comprising, an input shaft having a rotational input force applied thereto, an output shaft connected to and rotatably operating a utilization device, a rotatable energy storage device, an energy transmitting shaft connected thereto, a gear differential interconnecting said input, output and energy transmitting shafts, said storage device including means for applying a rotational force to said energy transmitting shaft which is greater than the normal resistive torque of said utilization device.

4. A motion storage device comprising, an input shaft having a rotational input force applied thereto, an output shaft connected to and rotatably operating a utilization device, a rotatable energy storage device, an energy transmitting shaft connected thereto, a gear differential interconnecting said input, output and energy transmitting shafts, said storage device including means for applying a preselected torque to said energy transmitting shaft which is greater than the normal resistive torque of said utilization device, said storage device including stop means for preventing movement of said energy transmitting shaft when the torque applied thereto is less than said preselected torque.

5. A motion storage device comprising, an input shaft having a rotational input force applied thereto, an output shaft, a utilization device connected to said output shaft and rotated thereby, said utilization device normally presenting a relatively low resistance to rotation movement by said output shaft but subject to increased resistance to such movement, a rotatable energy storage device, an energy transmitting shaft connected thereto, a gear differential interconnecting said input, output and energy transmitting shafts, said storage device including a resilient member applying a preselected torque to said energy transmitting shaft which is greater than the normal resistance to rotation of said utilization device but less than said increased resistance, and stop means incorporated in said storage device preventing movement of said energy transmitting shaft by forces applied thereto which are less than said preselected torque.

6. A motion storage device comprising, an input shaft having a rotational input force applied thereto, an output shaft, a utilization device connected to said output shaft and rotated thereby, said utilization device normally presenting a relatively low resistance to rotation by said output shaft but subject to the application of increased resistance to such rotation, at least one gear, resilient means for urging said gear in one direction of rotation, stop means carried by said gear cooperating with fixed stop means for limiting the movement thereof in said one direction, an energy transmitting shaft, torque transmitting means interconnecting said gear and said energy transmitting shaft, and a gear differential interconnecting said input, output and energy transmitting shafts.

7. A motion storage device comprising, an input shaft having a rotational input force applied thereto, an output shaft, a utilization device connected to said output shaft and rotated thereby, said utilization device normally presenting a relatively low resistance to rotation by said output shaft but subject to the application of temporary increased resistance to such rotation, a pair of gears, spring means connected to each of said gears for urging said gears in opposite directions of rotation, stop means carried by each of said gears cooperating with fixed stop means for limiting the movements thereof in the respective directions in which they are urged by said spring means, a pair of shafts one of which is rotatably coupled to one of said gears and the other of which is rotatably coupled to the other of said gears, an energy transmitting shaft, a first differential interconnecting said pair of shafts and said energy transmitting shaft, and a second differential interconnecting said input, output and energy transmitting shafts.

8. A motion storage device as set forth in claim 7 having a governor coupled to said energy transmitting shaft for limiting the speed of rotation thereof.

9. A motion storage device as set forth in claim 7 in which said spring means is placed under an initial tension force which is greater than the normal resistance to rotation presented by said utilization device but is less than the temporary increased resistance.

References Cited in the file of this patent

UNITED STATES PATENTS

| | | |
|---|---|---|
| 1,781,679 | Brenchley | Nov. 18, 1930 |
| 2,086,030 | Hodgson | July 6, 1937 |
| 2,137,574 | Kromer | Nov. 22, 1938 |
| 2,387,047 | Weiss | Oct. 16, 1945 |
| 2,526,373 | Clair | Oct. 17, 1950 |